(12) United States Patent  
 Ziolkowski et al.

(10) Patent No.: US 8,274,288 B2  
(45) Date of Patent: Sep. 25, 2012

(54) MULTI-TRANSIENT DC RESISTIVITY MEASUREMENTS

(75) Inventors: Antoni Marjan Ziolkowski, Edinburgh (GB); Bruce Alan Hobbs, Penicuik (GB)

(73) Assignee: MTEM Ltd, Edinburgh (GB)

( * ) Notice: Subject to any disclaimer, the term of this patent is extended or adjusted under 35 U.S.C. 154(b) by 596 days.

(21) Appl. No.: 11/990,035

(22) PCT Filed: Aug. 4, 2006

(86) PCT No.: PCT/GB2006/002940  
§ 371 (c)(1),  
(2), (4) Date: Aug. 19, 2010

(87) PCT Pub. No.: WO2007/017657  
PCT Pub. Date: Feb. 15, 2007

(65) Prior Publication Data  
US 2010/0315088 A1  Dec. 16, 2010

(30) Foreign Application Priority Data  
Aug. 5, 2005 (GB) .................................. 0516153.4

(51) Int. Cl.  
*G01V 3/00* (2006.01)
(52) U.S. Cl. ......... 324/336; 324/337; 324/354; 324/357
(58) Field of Classification Search .......... 324/334–340, 324/345, 354, 357–358; 702/6–7, 16  
See application file for complete search history.

(56) References Cited

U.S. PATENT DOCUMENTS

| | | | |
|---|---|---|---|
| 2,177,346 A | 10/1939 | Saibara et al. | |
| 2,230,803 A | 2/1941 | Klipsch et al. | |
| 4,041,372 A * | 8/1977 | Miller et al. | 324/357 |
| 4,417,210 A | 11/1983 | Rocroi et al. | |
| 4,467,283 A * | 8/1984 | Owen et al. | 324/363 |
| 4,535,293 A * | 8/1985 | Rocroi et al. | 324/336 |
| 4,835,473 A * | 5/1989 | Bostick, Jr. | 324/357 |
| 5,467,018 A | 11/1995 | Ruter et al. | |
| 5,563,513 A * | 10/1996 | Tasci et al. | 324/359 |
| 5,877,995 A * | 3/1999 | Thompson et al. | 367/14 |
| 6,477,113 B2 * | 11/2002 | Hornbostel et al. | 367/38 |
| 6,603,313 B1 * | 8/2003 | Srnka | 324/354 |
| 6,819,111 B2 * | 11/2004 | Fanini et al. | 324/339 |
| 6,914,433 B2 * | 7/2005 | Wright et al. | 324/336 |

(Continued)

FOREIGN PATENT DOCUMENTS

FR  2475745  8/1981

(Continued)

OTHER PUBLICATIONS

International Search Report, dated Dec. 13, 2005.

(Continued)

*Primary Examiner* — Joshua Benitez

(57) ABSTRACT

A method for measuring resistivity variations in the earth comprising passing a transient current between two source electrodes; measuring the transient current at the source electrodes; measuring the resultant transient voltage between at least one pair of receiver electrodes; estimating one or more processing functions for applying to the measured input current to provide a step current profile, and applying the same one or more processing functions to the measured voltage to provide an estimate of the step response voltage between the receivers, using both the step current and the estimated step response voltage to determine the resulting apparent earth resistance, and using the apparent earth resistance to determine the resistivity of the earth.

14 Claims, 11 Drawing Sheets

U.S. PATENT DOCUMENTS

| | | | |
|---|---|---|---|
| 6,999,878 B2 * | 2/2006 | Manin | 702/7 |
| 7,034,539 B2 * | 4/2006 | Ueda et al. | 324/357 |
| RE40,321 E * | 5/2008 | Srnka | 324/354 |
| 7,561,997 B1 * | 7/2009 | Miller | 703/10 |
| 7,742,875 B2 * | 6/2010 | Li et al. | 702/12 |
| RE41,829 E * | 10/2010 | Hornbostel et al. | 324/323 |
| 2003/0035376 A1 | 2/2003 | Chen | |
| 2005/0237063 A1 * | 10/2005 | Wright et al. | 324/336 |
| 2009/0309599 A1 * | 12/2009 | Ziolkowski | 324/334 |

FOREIGN PATENT DOCUMENTS

| | | |
|---|---|---|
| WO | 9114954 A1 | 10/1991 |
| WO | WO 03/023452 | 3/2003 |

OTHER PUBLICATIONS

International Search Report, dated Nov. 28, 2006.

International Search Report, dated Feb. 5, 2008.

Frank Wenner, "Method of Measuring Earth Resistivity", (1915), Department of Commerce, Bulletin of the Bureau of Standards, vol. 12, pp. 469-478.

M.H. Loke, "Electrical Imaging surveys for environmental and engineering studies", (1999), Copyright Dr. M.H. Loke, pp. 1-55.

L.S. Edwards, "Modified Pseudosection for Resistivity and IP", (1977), Geophysics, vol. 42, No. 5, pp. 1020-1036.

* cited by examiner

MULTI-TRANSIENT DC RESISTIVITY MEASUREMENTS

CROSS REFERENCE TO RELATED APPLICATION

The present application is the U.S. national stage application of International Application PCT/GB2006/002940, filed on Aug. 4, 2006, which international application was published on Feb. 15, 2007 as International Publication WO 2007/017657. The International Application claims priority of United Kingdom Patent Application GB 0516153.4 filed on Aug. 5, 2005.

The present invention relates to multi-transient DC resistivity measurements. In addition, the invention relates to system and method for estimating the response of the earth using such multi-transient DC resistivity measurements, thereby to detect, for example, hydrocarbon-bearing or water-bearing formations.

BACKGROUND OF THE INVENTION

Porous rocks are saturated with fluids. The fluids may be water, gas, or oil, or a mixture of all three. The flow of current in the earth is determined by the resistivities of such rocks, which are affected by the saturating fluids. For instance, brine-saturated porous rocks are much less resistive than the same rocks filled with hydrocarbons. Hence, the geophysical objective is to determine whether hydrocarbons are present by measuring the resistivity of geological formations. If tests using other methods, for instance seismic exploration, suggest that a geological formation has the potential to bear hydrocarbons, then before drilling it is important to have some indication as to whether the formation does in fact contain hydrocarbons or whether it is primarily water bearing. This can be done using electromagnetic techniques, and more specifically time domain electromagnetic techniques.

For nearly a century direct current (DC) methods have been used on the earth's surface to determine subsurface resistivity distributions. The earliest work was by the Schlumberger brothers and by Wenner (Wenner, F., 1912, A method for measuring earth resistivity. US Bureau of Standards Bulletin, 12,469-478.). There are three general DC resistivity surveying methods: vertical electrical soundings (VES), profiling, and imaging. In VES surveys the dimensions of a selected measurement array increase whilst the central point of the array remains fixed. As the array expands, currents penetrate deeper and the resulting sounding curves are interpreted as resistivity changes with depth. In profiling surveys both the array type and its dimensions are selected for a particular depth of investigation. The array is moved along the surface to determine lateral variations of resistivity. The imaging, or earth resistance tomography (ERT) method, combines VES and profiling. In this, a large number of electrodes are placed in the ground, usually equally spaced, and are connected with a multi-core cable to a resistivity meter. The system operates under software control where any two electrodes may be selected as current electrodes, and any two others may be selected as potential (voltage) electrodes. Resistivity values are obtained on a cross section beneath the profile and indicate both lateral and depth variations.

DC measurements are made by injecting direct current between two source electrodes S1 and S2 and measuring the voltage between two receiver electrodes R1 and R2. From the current I injected at the source electrodes and voltage V measured at the receiver electrodes, a value of the apparent earth resistance is obtained by Ohm's law:

$$R_{app} = V/I \text{ Ohm} \tag{1}$$

An apparent value of the subsurface resistivity $\rho_{app}$ can be obtained from this resistance as $$\rho_{app} = kR_{app} \text{ Ohm m} \tag{2}$$

in which k has units of metres and is a geometric factor that depends on the arrangement of the four electrodes. Using this apparent resistivity, the true sub-surface resistivity can be determined. A good review of techniques for determining the true value of the subsurface resistivity distribution from the apparent resistivity values is given by Loke M. H., 1999, in Electrical imaging surveys for environmental and engineering studies (http://www.abem.com/fip/Loke/2Dnotes.pdf).

There are several well-known configurations of the four electrodes for DC measurements, three of which are illustrated in FIGS. 1 to 3. FIG. 1 shows the Wenner array, FIG. 2 shows the Schlumberger array, and FIG. 3 shows the dipole-dipole array. For each array there is a different k factor, as given below $$k_{WENNER} = 2\pi a, \tag{3}$$

$$k_{SCHLUMBERGER} = \frac{2\pi a^2}{b}\left[1 - \frac{b^2}{4a^2}\right], \text{ for } a \geq 5b, \tag{4}$$

$$k_{DIPOLE-DIPOLE} = \pi an(n+1)(n+2). \tag{5}$$

The dipole-dipole array of FIG. 3 determines lateral resistivity variations better than depth variations. The potential difference to be measured between the potential electrodes decays with the cube of the distance from the current electrodes. This has restricted the configuration of the array for practical purposes to values of $n \leq 6$. Edwards (Edwards, L. S., 1977, A modified pseudosection for resistivity and IP. Geophysics, 42, 1020-1036) discussed the presentation of pseudo-sections for resistivity and IP specifically for the dipole-dipole array. Theory and practical results are presented for $n \leq 6$ and reference is made to an "ideal array" with $n = \infty$.

As shown in FIG. 5, the depth of investigation d is related to the dipole lengths a and the dipole separation na. In this case, the maximum depth of investigation d for which the earth's resistivity can be inferred is related to the configuration and is of the order of (n+2)a/5. In practice, since the signal amplitude at the receivers decreases approximately as $(na)^{-3}$, while the noise level is independent of n and a, the signal-to-noise ratio decreases as $(na)^{-3}$. The signal level can be increased by increasing the current injected at the source and by increasing the dipole distance a. With the levels of current that can be safely injected into the ground, the n is normally not greater than about 6, and it follows that $$d \leq 1.6a \tag{6}$$

In other words, the depth of investigation d is less than 1.6 times the separation a between source or receiver electrodes. Increasing a increases the depth of investigation but reduces the resolution of the mapped subsurface resistivity distribution.

When making DC measurements, it has been found that the electrodes become polarised if the current is the same polarity for a long time and a false measurement of the voltage in the earth between R1 and R2 is obtained. Two strategies are used to overcome this problem. One is to use non-polarising electrodes. The other, more popular, approach is to switch the polarity of the DC current periodically; this in fact gives an alternating square-wave input current, or AC. All modern equipment uses this technique.

In the AC approach variations can be introduced, such as switching the current to zero for certain periods, for instance as shown in FIG. 4. In this case, the period T between switches is typically of the order of 1 second. The function shown here repeats every 4T. In the periods that the current is switched on between source electrodes S1 and S2, an estimate of the resulting DC voltage between R1 and R2 is made. In fact, the voltage between R1 and R2 is not exactly constant in these periods: the signal takes some time to reach a steady-state value and there is noise. To compensate for the noise various averaging techniques are used. It should be noted that in this context the term 'DC' in 'DC resistivity' means essentially low frequency, rather than zero frequency. This is already accepted in the geophysical exploration industry.

Every time the current at the source electrodes is switched, the earth responds and the voltage at the receiver electrodes changes. The flow of current in the ground is governed by the diffusion equation and it takes time for the response at the receiver to reach a steady state. This is well known, and the estimate of the DC level is measured in a time interval towards the end of the period that the current is switched on. For example, the Geopulse Tigre Resistivity Meter uses voltage measurements that are made during the latter 4/5 of the on period of the current (User's Manual, Geopulse Resisitivity Meter, Campus International Products Limited, Concept House, 8 The Townsend Centre, Blackburn Road, Dunstable, Bedford, England LU5 5BQ). Thus it is known that there is a transient response to the switching of the current, but after a certain time it is considered that the steady state response is reached.

In this conventional approach, the expected time to reach steady state is based on experience, although it is fully understood that the final steady state value is never reached. For practical purposes, however, for this configuration, and within the limitations of the instrumentation and the noise, the steady state value is usually reached after about 0.1 seconds. In some deep low-resolution surveys, where the scale of the setup is increased by an order of magnitude or so, the steady state value may be reached, for practical purposes, only after a few seconds. An example of a measured voltage response to a switch-on current using the dipole-dipole configuration is shown in FIG. 6. This is called the step response. The first part of the response shows an initial step in voltage; in this particular case this is followed by a small dip followed by a rise in voltage that appears to be tending to a steady-state value after about 0.1 s.

FIG. 7 shows the time derivative of the step response of FIG. 6. This is known as the impulse response. The initial large spike in the impulse response corresponds to the initial step in the step response. This is followed by a dip, a rise to a smaller peak, and then a very gradual decrease in amplitude, tending to zero as time increases thereafter. The duration of the impulse response is infinite, just as the duration of the step response is infinite. However, as the amplitude of the impulse response gets smaller and smaller, it becomes harder and harder to measure. When the amplitude is too small to measure, this effectively defines the duration of the transient impulse response.

An object of the present invention is to improve the sensitivity of resistivity measurements of the earth.

SUMMARY OF THE INVENTION

According to one aspect of the present invention, there is provided a method for measuring resistivity variations in the earth comprising passing a current between two source electrodes; measuring the transient current at the source electrodes; measuring the resultant transient voltage between at least one pair of receiver electrodes; estimating one or more processing functions for applying to the measured input current to provide a step input profile, and applying the same one or more processing functions to the measured voltage to provide an estimate of the step response voltage between the receivers, using both the step current and the estimated step response voltage to determine the resulting apparent earth resistance, and using the apparent earth resistance to determine the resistivity of the earth. Determination of the resistivity can be done using standard DC resistivity inversion methods.

The processing function could be a filter. An alternative approach is to use a filter to convert the measured current to an impulse and to integrate the result to obtain a step in current; applying the same filter to the measured voltage and integrating the result would yield the step response voltage. There may be other methods to achieve the same result. The key point is that processing methods may be used to convert the measured transient input current and voltage response into a step and a step response, respectively, thereby yielding the DC response.

Using this technique improves the sensitivity of the DC resistivity measurement to such an extent that the value of n can be increased by at least an order of magnitude to about 80 or so, which therefore allows d to be increased to about 120$a$. Hence, the investigation depth can be increased by more than an order of magnitude without a reduction in the resolution of the mapped subsurface resistivity distribution.

In accordance with the present invention, both the input current at the source and the measured voltage at the receiver are measured and recorded as a function of time. The time functions are converted to digital data and processed in a computer using computer software. The computer processing can include many operations, including the removal of cultural noise—such as 50 Hz or 60 Hz mains generation—and removal of the recording system response by deconvolution, as disclosed in WO 03/023452 A1.

The input current may be a simple step, a square wave, or even a return to zero modulation signal—often known as a 'duty cycle'—shown in FIG. 4. Also, it could, for example, be a pseudo-random binary sequence of ones and zeros, or ones and minus ones, which would enable the step response of the earth between source and receiver (and hence the steady-state value) to be deduced.

According to another aspect of the present invention, there is provided a system for measuring resistivity variations in the earth comprising a source for passing a current between two source electrodes; a current measurement device for measuring a transient current at the source electrodes; a voltage measurement device for measuring the resultant transient voltage between at least one pair of receiver electrodes; and a processor configured to estimate one or more processing functions for applying to the measured input current to provide a step current profile; apply the same one or more processing functions to the measured voltage to provide an estimate of the step response voltage between the receivers; use both the step current and the estimated step response voltage to determine the resulting apparent earth resistance, and use the apparent earth resistance to determine the resistivity of the earth.

According to yet another aspect of the invention, there is provided a computer program for determining resistivity variations in the earth using a measure of input current between a pair of source electrodes and a measure of the resultant transient voltage between at least one pair of receiver electrodes, the computer program having code or instructions for estimating one or more processing functions for applying to the measured input current to provide a step current profile; applying the same one or more processing functions to the measured voltage to provide an estimate of the step response voltage between the receivers; using both the step current and the estimated step response voltage to determine the resulting apparent earth resistance, and using the apparent earth resistance to determine the resistivity of the earth.

BRIEF DESCRIPTION OF THE DRAWINGS

Various aspects of the invention will now be described by way of example only and with reference to the accompanying drawings, of which.

SPECIFIC DESCRIPTION OF THE DRAWINGS

Figure 1:
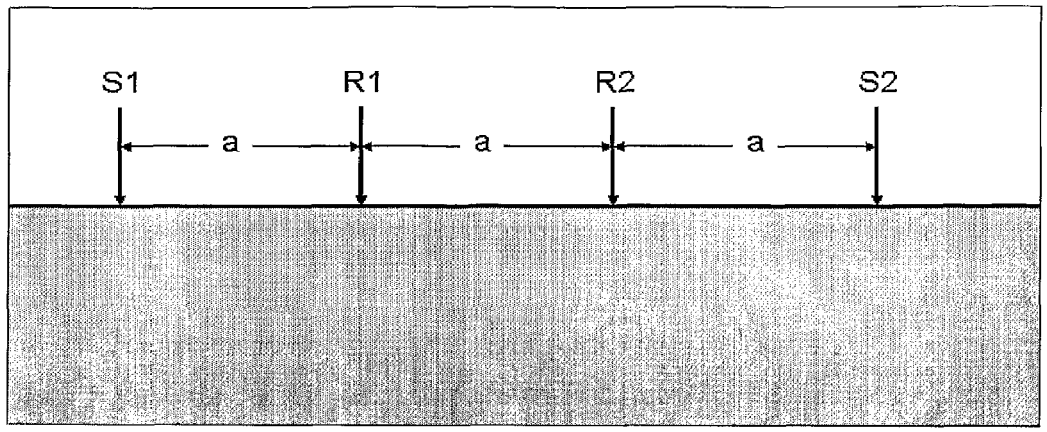
FIG. 1 illustrates a possible configuration of four electrodes for DC measurements.
Figure 2:
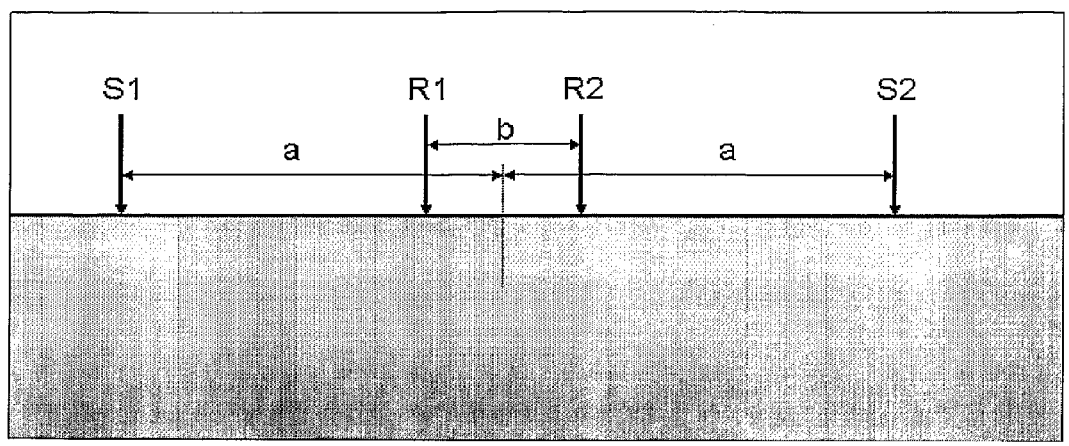
FIG. 2 illustrates another possible configuration of four electrodes for DC measurements.
Figure 3:
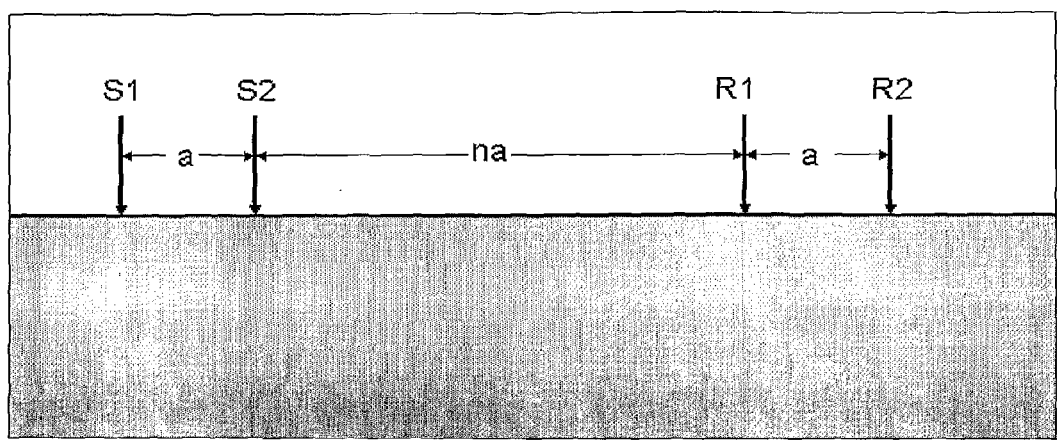
FIG. 3 illustrates yet another possible configuration of four electrodes for DC measurements.
Figure 4:
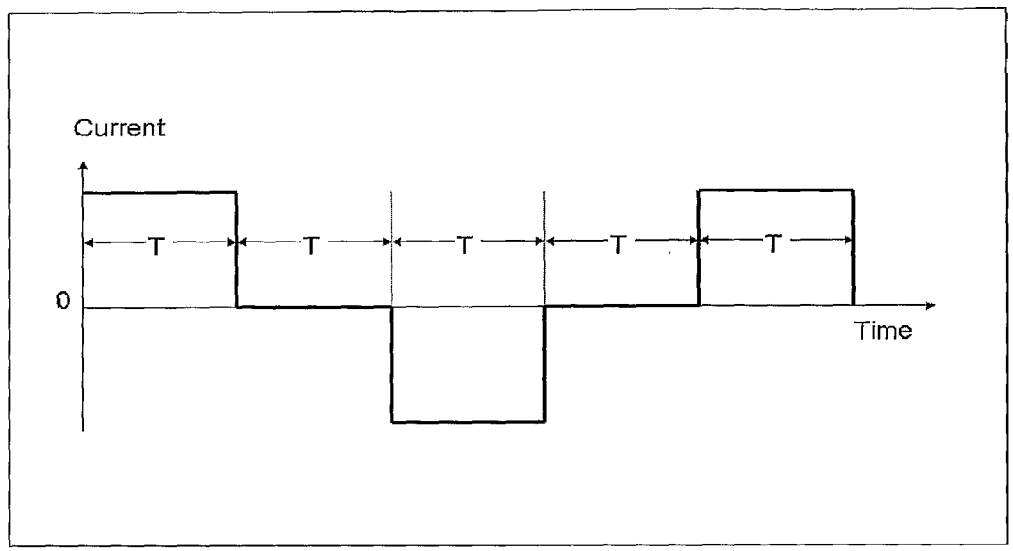
FIG. 4 illustrates a possible alternating square-wave input current.
Figure 5:
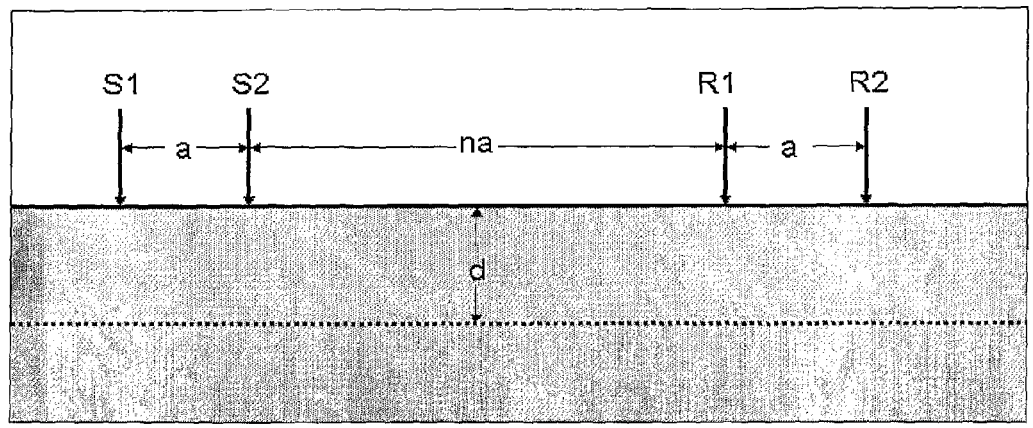
FIG. 5 illustrates a possible configuration of four electrodes for DC measurements, showing the depth of investigation d related to the dipole lengths a and the dipole separation na.
Figure 6:
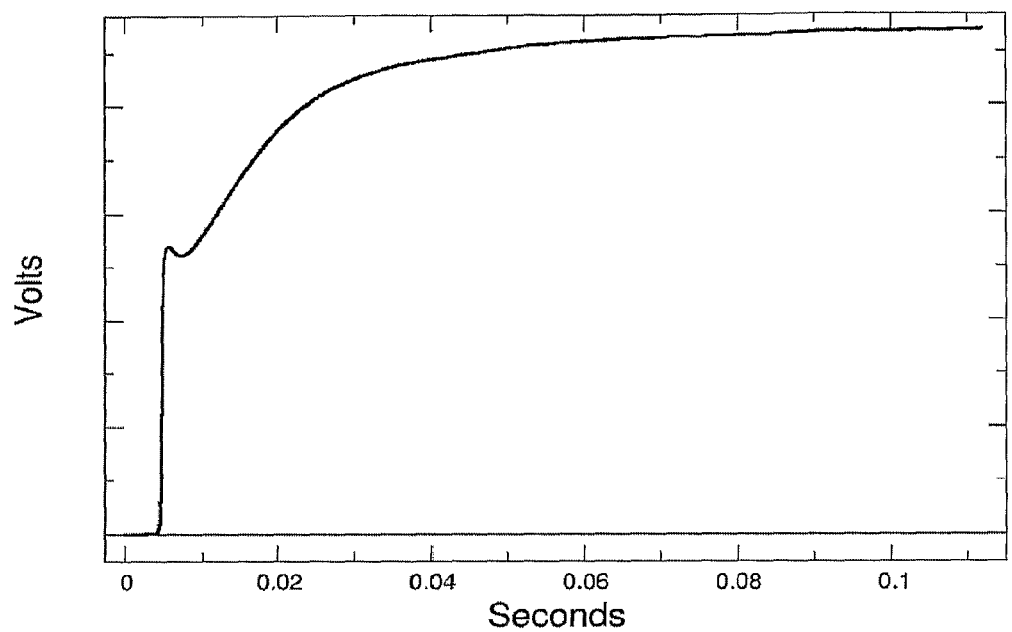
FIG. 6 illustrates a possible measured voltage response to a switch-on current.
Figure 7:
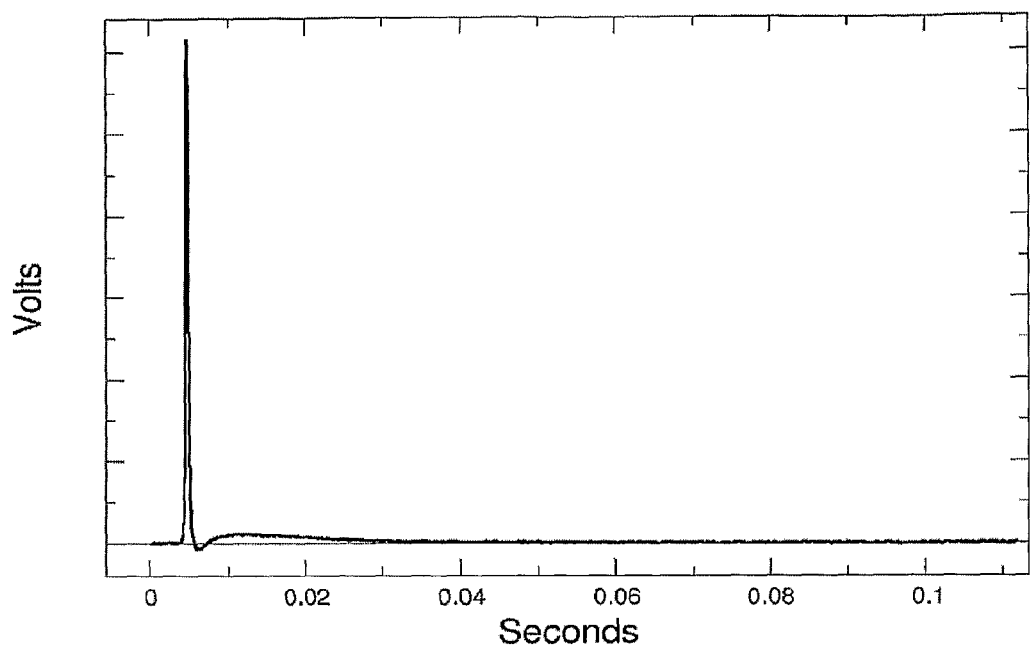
FIG. 7 illustrates the time derivative of the step response of FIG. 6.
Figure 8:
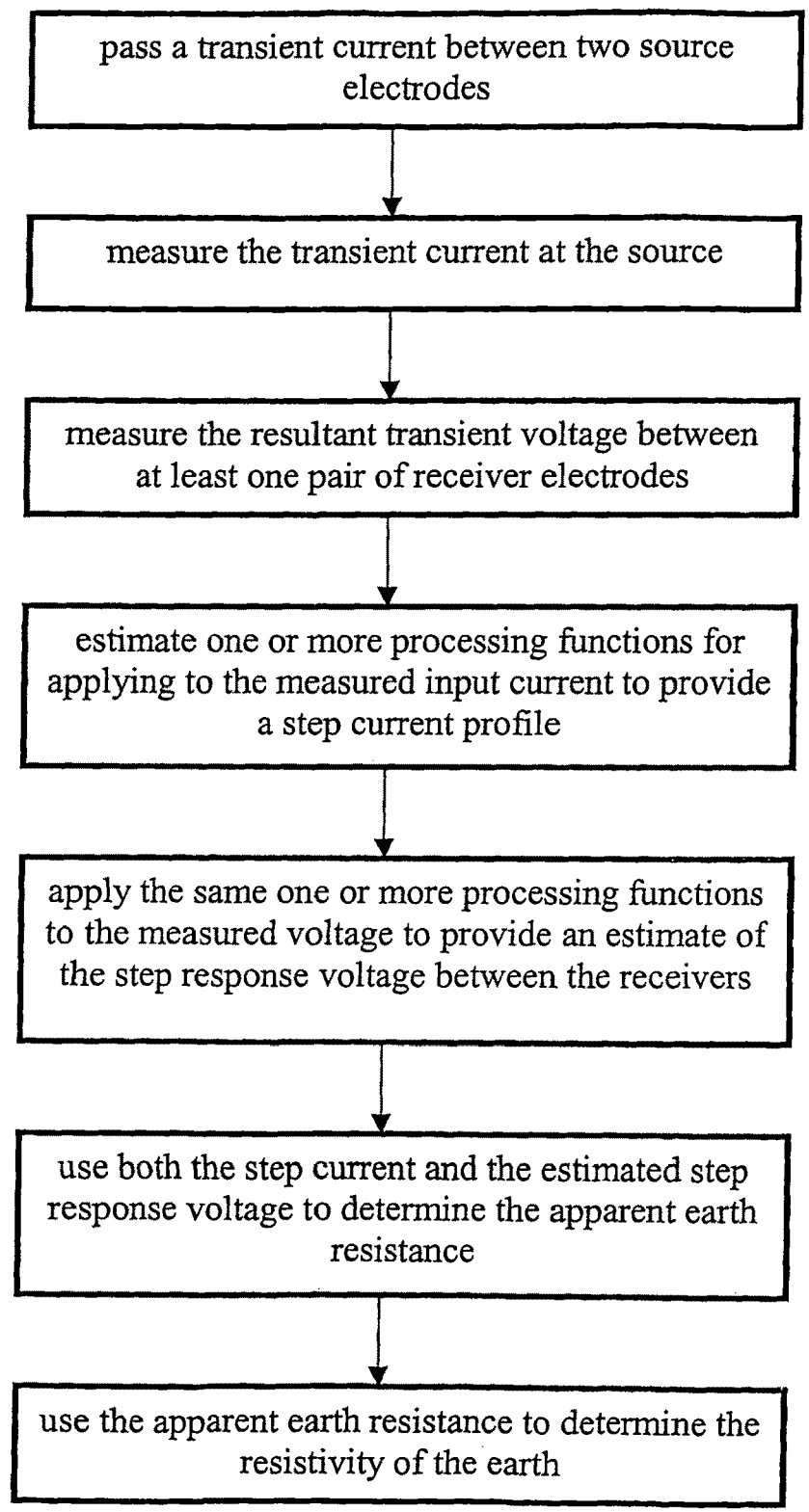
FIG. 8 is a flow diagram of a method for determining the resistivity of the earth using DC measurements.

The source/receiver electrode arrangements of FIGS. 3 and 5 can be used to implement the invention. This requires the measurement of the source input current time function, which may be done with a current meter positioned ideally between the source electrodes, so that a direct measure of the input current can be made. The current meter may be of any suitable form, for example a magnetometer.

Figure 9:
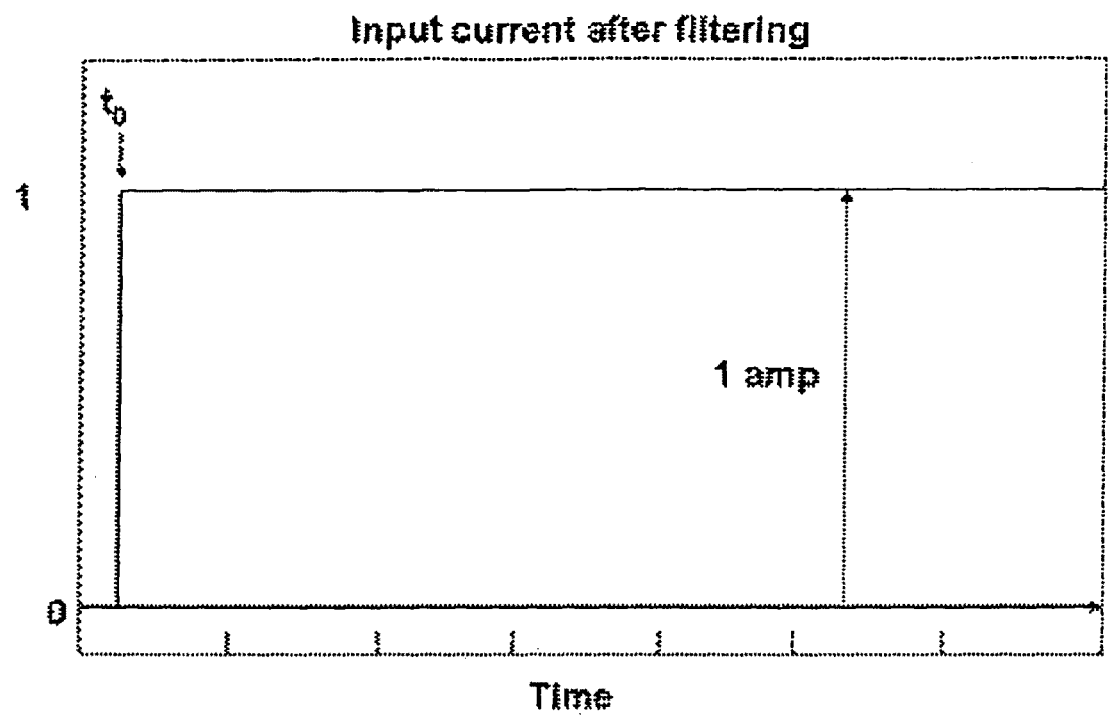
FIG. 9 is a plot of the measured input current after a filter is applied.

FIG. 9 shows the method in which the invention is embodied. In a first step a transient input current is passed between two source electrodes and measured between two receiver electrodes. The measured input current function can be expressed as, say, I(t), where t is time. This measured current is converted to a step function of, say, unit amplitude, by convolving with a filter $f(t)$ as follows:

$$I(t)*f(t)=H(t-t_0) \tag{7}$$

where H(t) is a unit step function and $t_0$ is the time of the step. The result is shown in FIG. 9.

The measured voltage response at the receiver is, say, M(t). This response can be convolved with the same filter $f(t)$ to yield the step response X(t):

$$M(t)*f(t)=X(t) \tag{8}$$

Figure 10:
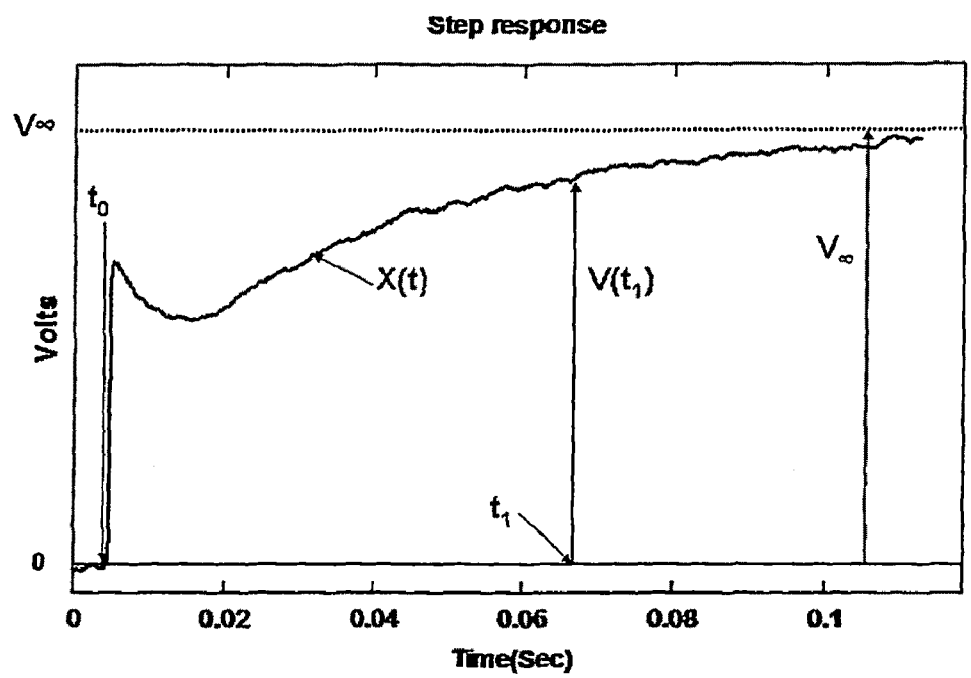
FIG. 10 is a plot of the measured voltage after application of the same filter used for the results of FIG. 9.

FIG. 10 shows the result of filtering a measured voltage to obtain the step response. In principle, as we have seen, it takes an infinite amount of time for the step response to reach the steady-state value $V_\infty$, and so $V_\infty$ is not actually measured. This is of course also true for the conventional so-called DC resistivity measurements. An estimate of the final value $V_\infty$ can be made by a variety of approaches, one of which is outlined below. The result is that the DC voltage $V_\infty$ for a 1 amp input current can be found and the earth resistance is thus $$R_{app}=V_\infty/1 \text{ ohms} \tag{9}$$

The steady state value of the voltage $V_\infty$ may be estimated by a variety of techniques. Referring to FIG. 10, the measured voltage at late times $t>t_1$ is described as $$V(t)=V_\infty+V_0 t^{-a}, \text{ for } t>t_1 \tag{10}$$

where $$V_0=[V(t_1)-V_\infty]t_1^a \tag{11}$$

in which $t_1$ can be varied, and is offset-dependent. The values of $V_\infty$ and a are found by fitting the curve described by equation (9) to the data and minimising the misfit error. This value can then be used to determine the DC resistance. The resulting value of the DC resistance for each source-receiver pair can be put into a two-dimensional or three-dimensional resistivity inversion program, such as RES2DINV and RES3DINV, as described in Loke (1999), to obtain a map of the subsurface resistivity distribution. Other input parameters to the program would be the coordinates of the electrodes.

Figure 11:
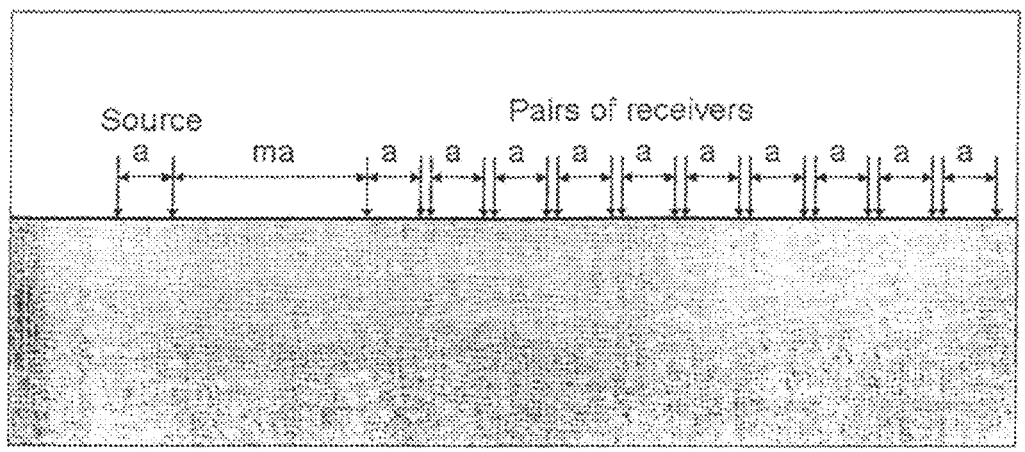
FIG. 11 is a schematic representation of a system in which a single pair of source electrodes is associated with a plurality of pairs of receiver electrodes.

For a given source-receiver pair, the measurement can be repeated many times and averaged (or 'stacked') allowing the signal-to-noise ratio to be improved and the estimate of the value of $V_\infty$ to be refined. For a given pair of source electrodes, many pairs of receiver electrodes may be provided and thus one may make many simultaneous measurements of the received voltages, as shown in FIG. 11. In this case, the source electrodes are separated by a distance a, and each pair of receiver electrodes is separated by a distance a. In this example n is chosen to be integer and its value is m, m+1, m+2, m+3, etc. Whilst a configuration in which the electrode separation at the source and each receiver pair are equal is shown, it will be appreciated that many different configurations are possible. Equally, the whole setup can be shifted sideways, for instance by a distance a or by multiples of a to obtain multiple coverage of the subsurface resistivity distribution.

A skilled person will appreciate that variations of the disclosed arrangements are possible without departing from the invention. For example, the method may be applied on land or offshore. In the marine case, the electrodes need not necessarily be on the sea floor, and may not need to be stationary. It is conceivable that the whole source-receiver electrode configuration could be towed behind a vessel that supplies current to the source and records the source current and received voltages. Accordingly, the above description of a specific embodiment is made by way of example only and not for the purposes of limitations. It will be clear to the skilled person that minor modifications may be made without significant changes to the operation described.

The invention claimed is:

1. A method for measuring resistivity variations in the earth comprising passing a transient current between two source electrodes; measuring the transient current at the source electrodes; measuring the resultant transient voltage between at least one pair of receiver electrodes; estimating one or more processing functions for applying to the measured input current to provide a step current profile, and applying the same one or more processing functions to the measured voltage to provide an estimate of a step response voltage between the receivers, using both the step current and the estimated step response voltage to determine a resulting apparent earth resistance, and using the apparent earth resistance to determine the resistivity of the earth.

2. A method as claimed in claim 1 wherein the step of applying the estimated processing function to the measured voltage involves convolution of the received voltages with the estimated processing function to find the corresponding step responses.

3. A method as claimed in claim 1 wherein the processing function is a filter for converting the measured input current to the step profile.

4. A method as claimed in claim 1 wherein the one or more processing functions comprise a filter for converting the measured current to an impulse and means for integrating the result to obtain the step input profile.

5. A method as claimed in any of claims 1, 2, 3 or 4 comprising removing cultural noise.

6. A method as claimed in any of claims 1, 2, 3 or 4 comprising estimating a steady state voltage from a step response.

7. A method as claimed in any of claims 1, 2, 3 or 4 wherein the source and receiver electrodes are provided in a marine environment.

8. A system for measuring resistivity variations in the earth comprising a source for passing a current between two source electrodes; a measurement device for measuring the transient current at the source electrodes; a voltage measurement device for measuring the resultant transient voltage between at least one pair of receiver electrodes; and a processor configured to estimate one or more processing functions for applying to the measured input current to provide a step current profile; apply the same one or more processing functions to the measured voltage to provide an estimate of a step response voltage between the receivers, use both the step current and the estimated step response voltage to determine a resulting apparent earth resistance, and use the apparent earth resistance to determine the resistivity of the earth.

9. A system as claimed in claim 8 wherein the processor is operable to apply the estimated processing function to the measured voltage by convolution of the received voltages with the estimated processing function to find the corresponding step responses.

10. A system as claimed in claim 8 wherein the processing function is a filter for converting the measured input current to the step profile.

11. A system as claimed in claim 8 wherein the one or more processing functions comprise a filter for converting the measured current to an impulse and means for integrating the result to obtain the step input profile.

12. A system as claimed in any of claims 8, 9, 10 or 11 wherein the processor is operable to remove cultural noise.

13. A system as claimed in any of claims 8, 9, 10, or 11 wherein the processor is operable to estimate a steady state voltage from a step response.

14. A system as claimed in any of claims 8, 9, 10 or 11 wherein the source and receiver electrodes are provided in a marine environment.

* * * * *